(12) United States Patent
Kobayashi et al.

(10) Patent No.: US 6,389,928 B1
(45) Date of Patent: May 21, 2002

(54) LOCK DEVICE FOR PARKING BRAKE LEVER

(75) Inventors: Hiroshi Kobayashi; Kenji Kamata, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,317

(22) Filed: May 18, 2000

(30) Foreign Application Priority Data

May 20, 1999 (JP) .......................................... 11-140306

(51) Int. Cl.$^7$ ................................................. G05G 5/08
(52) U.S. Cl. ...................... 74/536; 74/502.2; 188/24.22
(58) Field of Search ........................ 74/490.14, 490.15, 74/512, 520, 502.2, 529, 536, 537; 188/24.11, 24.22

(56) References Cited

U.S. PATENT DOCUMENTS

| | | | | |
|---|---|---|---|---|
| 2,851,900 A | * | 9/1958 | Powell .......................... | 74/536 |
| 4,604,913 A | | 8/1986 | Kyonomine .................. | 74/540 |
| 4,667,785 A | * | 5/1987 | Toyoda et al. ............... | 74/502.2 |
| 4,850,241 A | * | 7/1989 | Buckley et al. .............. | 74/502.2 |
| 4,914,971 A | * | 4/1990 | Hinkens et al. ............. | 74/502.2 |
| 4,938,057 A | | 7/1990 | Yamazaki .................... | 73/118.1 |
| 5,235,867 A | * | 8/1993 | Wortmann et al. ........... | 74/536 |
| 5,588,335 A | * | 12/1996 | Strait .......................... | 74/512 |
| 5,611,249 A | * | 3/1997 | Perisho et al. ............... | 74/512 |
| 5,907,977 A | * | 6/1999 | Huebner et al. .............. | 74/536 |
| 6,105,459 A | * | 8/2000 | Troiano ........................ | 74/529 |
| 6,216,825 B1 | * | 4/2001 | Hung .......................... | 188/24.22 |
| 6,223,624 B1 | * | 5/2001 | Iwanaga et al. ............. | 74/529 |

FOREIGN PATENT DOCUMENTS

EP 0067692 12/1982

* cited by examiner

*Primary Examiner*—Chong H. Kim
(74) *Attorney, Agent, or Firm*—Arent Fox Kintner Plotkin & Kahn, PLLC

(57) ABSTRACT

A locking device for a parking brake is provided which ensures that the operation of locking a parking brake lever and the operation of releasing the locking of the parking brake lever can be carried out in a single stage. The parking brake lever is pivotally supported on a mounting bracket mounted on a steering handle by a first support shaft, and a lever locking member is pivotally supported on the mounting bracket by a second support shaft, and biased by a torsion spring. When the parking brake lever is operated, an engage groove in the parking brake lever is brought into engagement with a locking pin, whereby the parking brake lever is locked at a brake operating position. When an operating portion of the lever locking member is urged in a direction against a resilient force of the torsion spring, the engagement of the engage groove and the locking pin with each other is released, whereby the parking brake lever is pulled by a Bowden cable and swung back to an original brake releasing position.

6 Claims, 8 Drawing Sheets

LOCK DEVICE FOR PARKING BRAKE LEVER

BACKGROUND OF INVENTION

1. Field of the Invention

The present invention relates to a lock device for a parking brake lever, which is suitable for a parking brake device for a small-sized vehicle.

2. Description of the Prior Art

A parking brake device for a small-sized vehicle such as an electric wheelchair, is designed to be operated by a parking brake lever mounted on a steering handle, and includes a lock device for locking the parking brake lever at a brake operating position to retain the parking brake device in an operative state, when a driver has operated the parking brake lever with his or her finger from a brake releasing position to the brake operating position.

The conventional lock device includes a lever locking member which is mounted in the vicinity of the parking brake lever and which is swingably supported and biased by a spring. The lock device is designed to lock the parking brake lever by swinging the lever locking member against the resilient force of the spring to bring it into engagement with the parking brake lever after operation of the parking brake lever from the brake releasing position to the brake operating position.

In the above conventional lock device, however, the operation for actuating the parking brake device comprises two stages of operating the parking brake lever and operating the lever locking member, resulting in a lower operability. Therefore, it has been desired to develop a lock device having a parking lever that can be locked in the brake operating position through a single-stage operation.

SUMMARY OF THE INVENTION

The present invention has been accomplished with the above circumstance in view, and it is an object of the present invention to provide a lock device for a parking brake lever, wherein both of the operation of locking the parking brake lever and the operation of releasing the locking of the parking brake lever can be conducted in a single stage.

To achieve the above object, there is provided a lock device for a parking brake lever, comprising a parking brake lever which is swingably supported on a support member by a first support shaft and which is operated from a brake releasing position to a brake operating position by a driver when braking. A first resilient biasing means biases the parking brake lever toward the brake releasing position. A lever locking member is swingably supported on the support member by a second support shaft and is swung to a locking position of locking the parking brake lever at the brake operating position when braking, and is operated from the locking position toward an unlocking position by the driver when releasing the braking. A second resilient biasing means biases the lever locking member toward the locking position. A first engage portion is provided on the parking brake lever, and a second engage portion is provided on the lever lock member and is capable of being brought into engagement with the first engage portion of the parking brake lever, so that when the driver operates the parking brake lever from the brake releasing position to the brake operating position for conducting the braking, the lever locking member is swung from the unlocking position to the locking position by the resilient force of the second resilient biasing means, whereby the first engage portion of the parking brake lever is brought into engagement with the second engage portion of the lever locking member swung to the locking position to lock the parking brake lever at the brake operating position. Thus, when the driver operates the lever locking member against the resilient force of the second resilient biasing means from the locking position to the unlocking position for releasing the braking, the second engage portion of the lever locking member is disengaged from the first engage portion of the parking brake lever, and the parking brake lever is swung from the brake operating position to the brake releasing position by the resilient force of the first resilient biasing means.

With the above arrangement, when the driver operates the parking brake lever from the brake releasing position to the brake operating position for braking, the lever locking member is swung from the unlocking position to the locking position by the resilient force of the second resilient biasing means, whereby the first engage portion of the parking brake lever is brought into engagement with the second engage portion of the lever locking member in the locking position to lock the parking brake lever in the brake operating position. Therefore, the lever locking member can be operated only by operating the parking brake lever to complete the locking operation of the parking brake lever. When the driver operates the lever locking member from the locking position to the unlocking position against the resilient force of the second resilient biasing means to release the braking, the second engage portion of the lever locking member is disengaged from the first engage portion of the parking brake lever, thereby permitting the parking brake lever to be swung from the brake operating position to the brake releasing position by the resilient force of the first resilient biasing means. Therefore, the parking brake lever can be operated only by operating the lever locking member to complete the releasing operation of the locking of the parking brake lever. In this way, both of the operation of locking the parking brake lever and the operation of releasing of the locking of the parking brake lever can be carried out in a single stage, leading to a remarkably enhanced operability.

BRIEF DESCRIPTION OF THE DRAWINGS

The mode for carrying out the present invention will now be described by way of an embodiment shown in the accompanying drawings.

FIG. 1 is a side view of the entire electric wheelchair.

FIG. 2 is a view taken in a direction of an arrow 2 in FIG. 1.

FIG. 3 is an enlarged view of a portion indicated by 3 in FIG. 1.

FIG. 4 is an enlarged view of an essential portion of FIG. 2.

FIG. 5 is a sectional view taken along a line 5—5 in FIG. 4.

FIG. 6 is a sectional view taken along a line 6—6 in FIG. 4.

FIG. 7 and FIG. 8 are views, similar to FIG. 4, for explaining the operation of the present invention.

DETAILED DESCRIPTION OF THE PREFERRED EMBODIMENT

Figure 1:
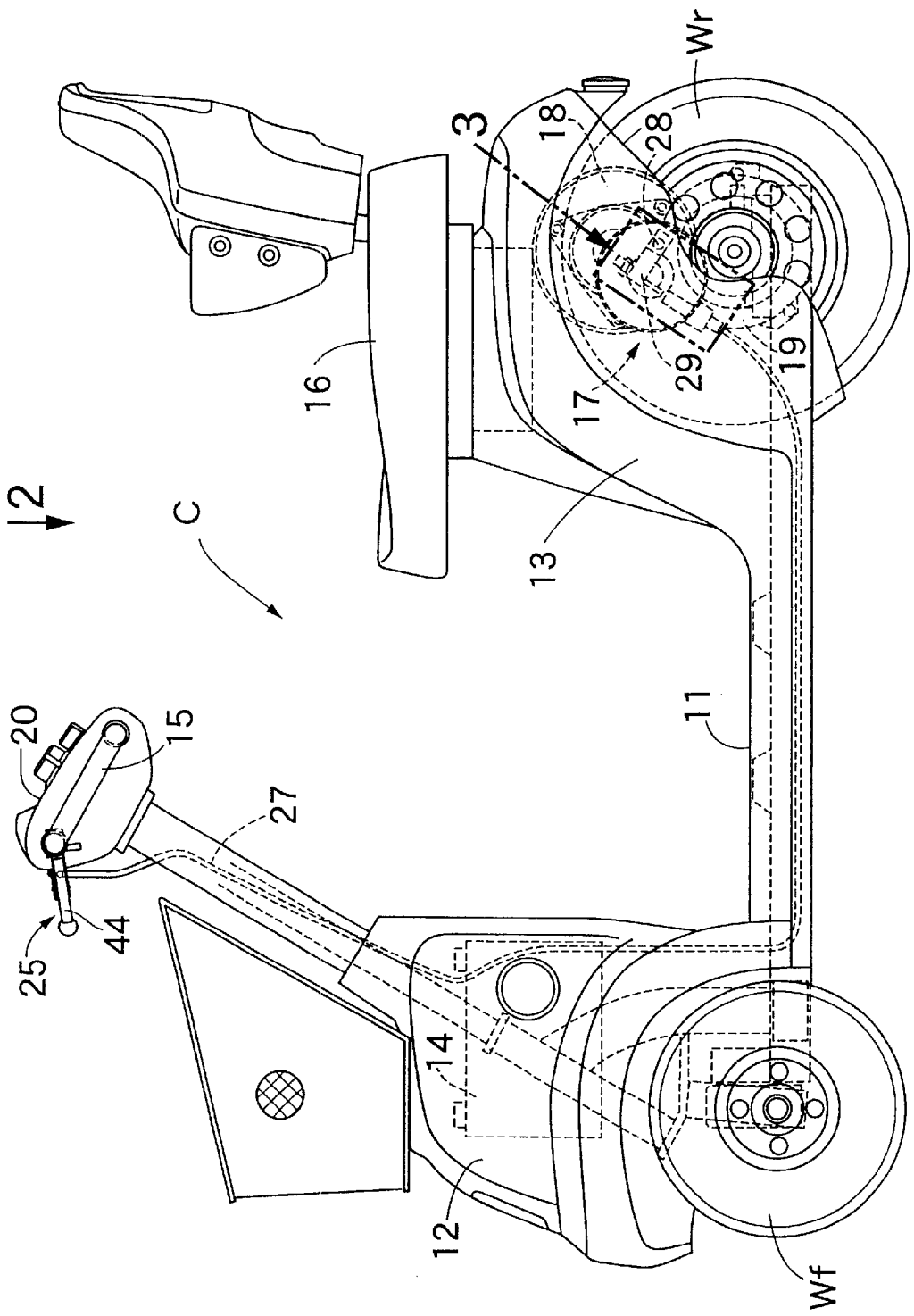
FIGS. 1 to 8 show an embodiment of the present invention.
Figure 2:
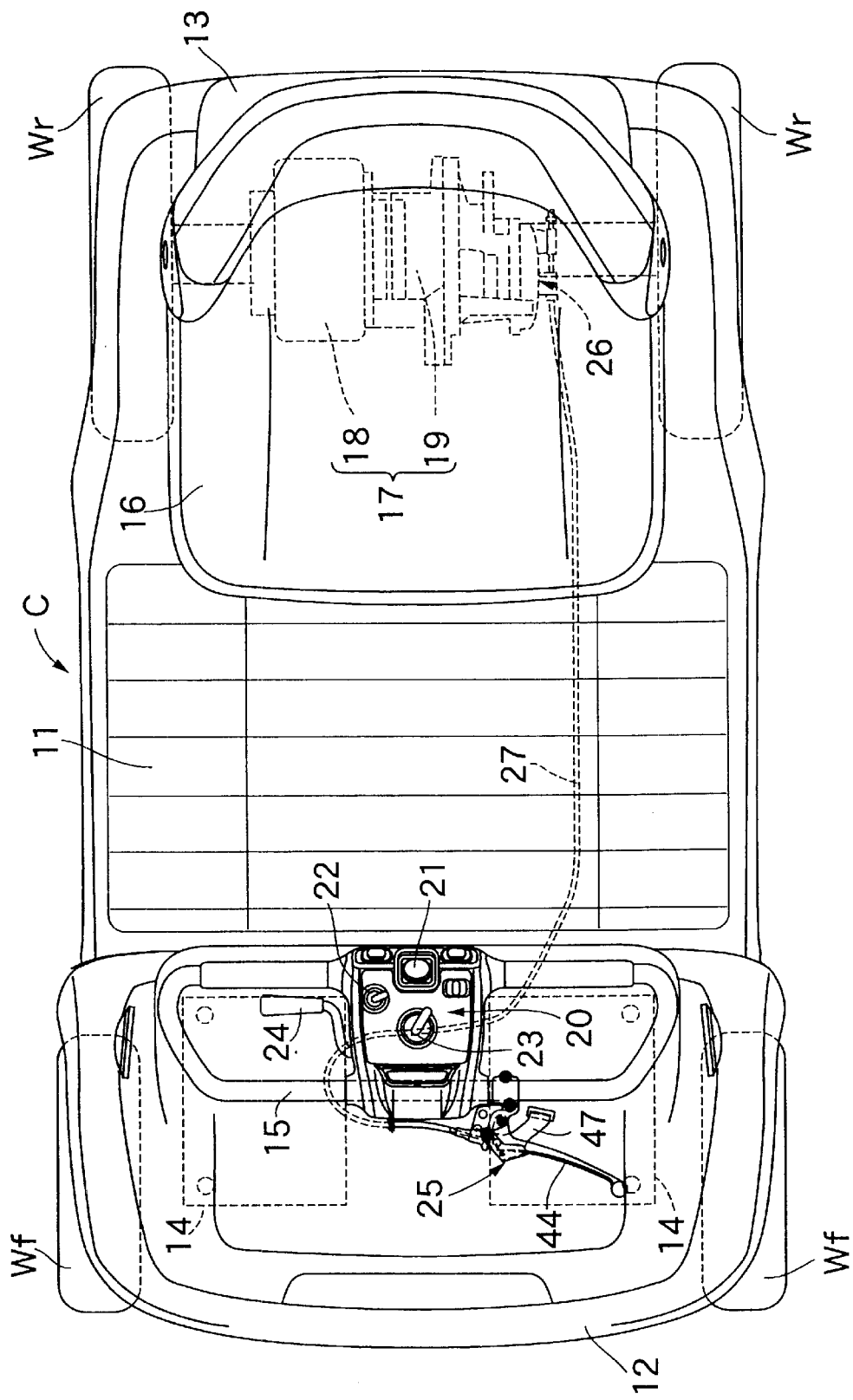

As shown in FIGS. 1 and 2, an electric wheelchair C including a pair of left and right front wheels Wf, Wf which are steering wheels, and a pair of left and right rear wheels Wr, Wr which are driven wheels, has a battery mounting section 12 and a power unit mounting section 13 at front and rear portions of a step floor 11 provided at a central portion of a vehicle body, respectively. Traveling batteries 14, 14 are mounted in the battery mounting section 12, and a loop-shaped steering handle 15 for steering front wheels Wf, Wf is supported on the battery mounting section 12. A seat 16 for a driver is supported on the power unit mounting section 13, and a power unit 17 for driving the rear wheels Wr, Wr is mounted in the power unit mounting section 13. The power unit 17 is comprised of a motor 18 driven by the batteries 14, 14, and a transmission 19 for transmitting a driving force of the motor 18 to the rear wheels Wr, Wr.

A power source switch 21, a forward and backward movement change-over switch 22 and a speed control 23 are mounted on a main control panel 20 provided at a central portion of the steering handle 15, and an accelerator lever 24 is mounted on the right side of the main control panel 20.

The power source switch 21 is capable of selectively assuming a "stop" position and a "drive" position. When the "stop" position is selected, a motor drive circuit connecting the batteries 14, 14 and the motor 18 is cut off. When the "drive" position is selected, the motor drive circuit is connected to bring the electric wheelchair C into a travelable state. The forward and backward movement change-over switch 22 is capable of selectively assuming a "forward movement" position and a "backward movement" position. When the "forward movement" position is selected, the electric wheelchair C travels forwards, and when the "backward movement" position is selected, the electric wheelchair C travels backwards. The speed control 23 is designed to set a highest speed of the electric wheelchair C, and when the accelerator lever 24 is operated, the travel speed of the electric wheelchair C is varied in a range up to the highest speed set by the speed control 23.

A parking brake operating device 25 is mounted on the steering handle 15 and connected through a Bowden cable 27 to a parking brake device 26 on the transmission 19 of the power unit 17. When the driver operates the parking brake operating device 25 upon stoppage of the electric wheelchair C, the parking brake device 26 comprising a drum brake, is operated through the Bowden cable 27 to brake a rotary shaft within the transmission 19, thereby indirectly braking the rear wheels Wr, Wr.

Figure 3:
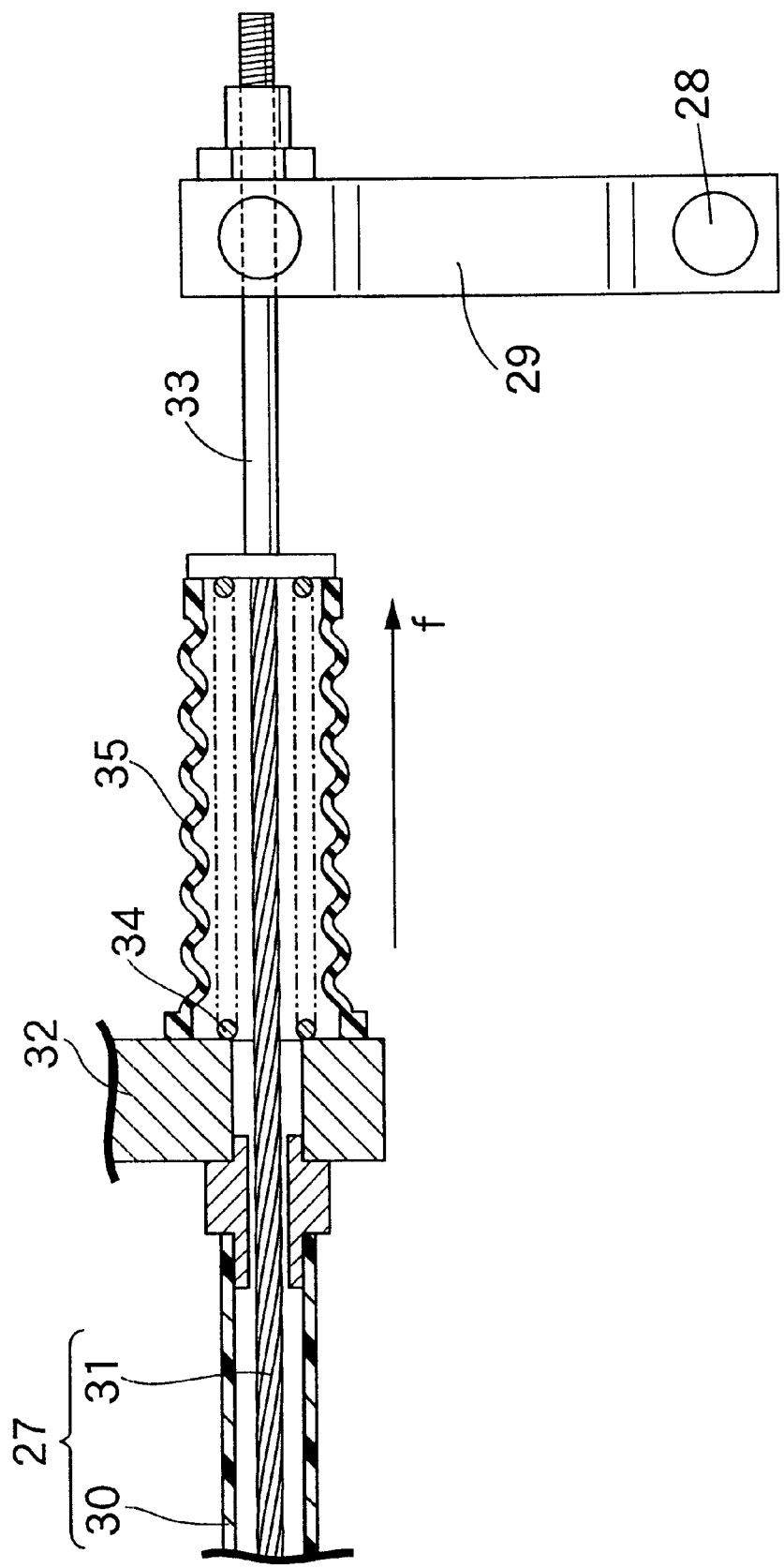

As shown in FIGS. 1 and 3, a brake arm 29 is fixed to the cam shaft 28 of the parking brake device 26 which protrudes out of the transmission 19. The Bowden cable 27 is comprised of an outer tube 30 and an inner cable wire 31. The outer tube 30 is fixed at its rear end to a bracket 32 supported on an outer surface of the transmission 19, and a joint 33 mounted at a rear end of the inner cable wire 31 is fixed to the brake arm 29. A return spring 34 is mounted under compression between the bracket 32 and the joint 33, whereby the inner cable wire 31 is biased in a direction to protrude out of the outer tube 30 (in the direction indicated by an arrow f). The inner cable wire 31 exposed from the outer tube 30, is covered with an expandable boot 35.

The parking brake operating device 25 includes a parking brake lever 44 which is pivotally supported for swinging movement by a first support shaft 43 on a mounting bracket 42 fixed to the steering handle 15 by two bolts 41, 41. In the Bowden cable 27, the outer tube 30 is fixed to the mounting bracket 42, and a locking pin 45 fixed to a tip end of the inner cable wire 31, is engaged into and fixed in a cable fixing groove $44_1$ defined in the parking brake lever 44. The inner cable wire 31 of the Bowden cable 27 is biased at its connection to the brake arm 29 rearwards by the return spring 34 (see FIG. 3) and hence, the parking brake lever 44 connected to the inner cable wire 31 is biased in a direction of an arrow A, about the first support shaft 43 and stopped at a brake releasing position in which a stop face $44_2$ thereof abuts against a stop face $42_1$ of the mounting bracket 42.

A lever locking member 47 is pivotally supported at its base end for s swinging movement on the mounting bracket 42, by a second support shaft 46. A torsion spring 48 is supported at its intermediate portion on the second support shaft 46, and locked at one end thereof to the mounting bracket 42 and at the other end thereof to a locking pin 49 provided on the lever locking member 47. Thus, the lever locking member 47 is biased in the direction of an arrow B about the second support shaft 46 by the torsion spring 48 and stopped at an unlocking position in which its stop face $47_1$ abuts against a stop face $44_3$ of the parking brake lever 44.

A recessed locking groove $44_4$, into which the locking pin 49 can be engaged, is defined in the base end of the parking brake lever 44. The lever locking member 47 is provided at its tip end with an operating portion $47_2$ which is capable of being urged by a thumb of a driver's left hand.

The operation of the embodiment of the present invention having the above-described arrangement will be described below.

Figure 4:
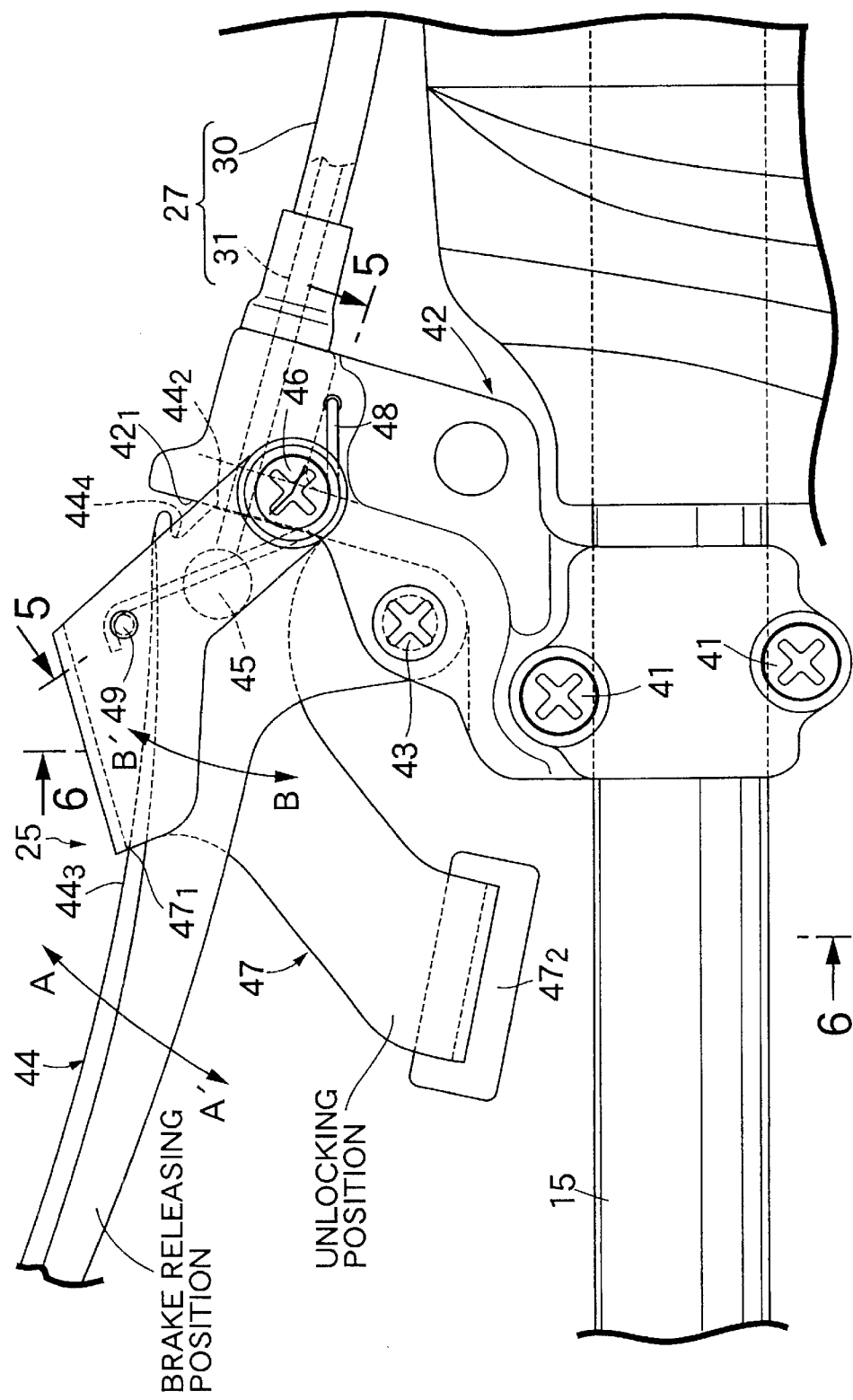
Figure 5:
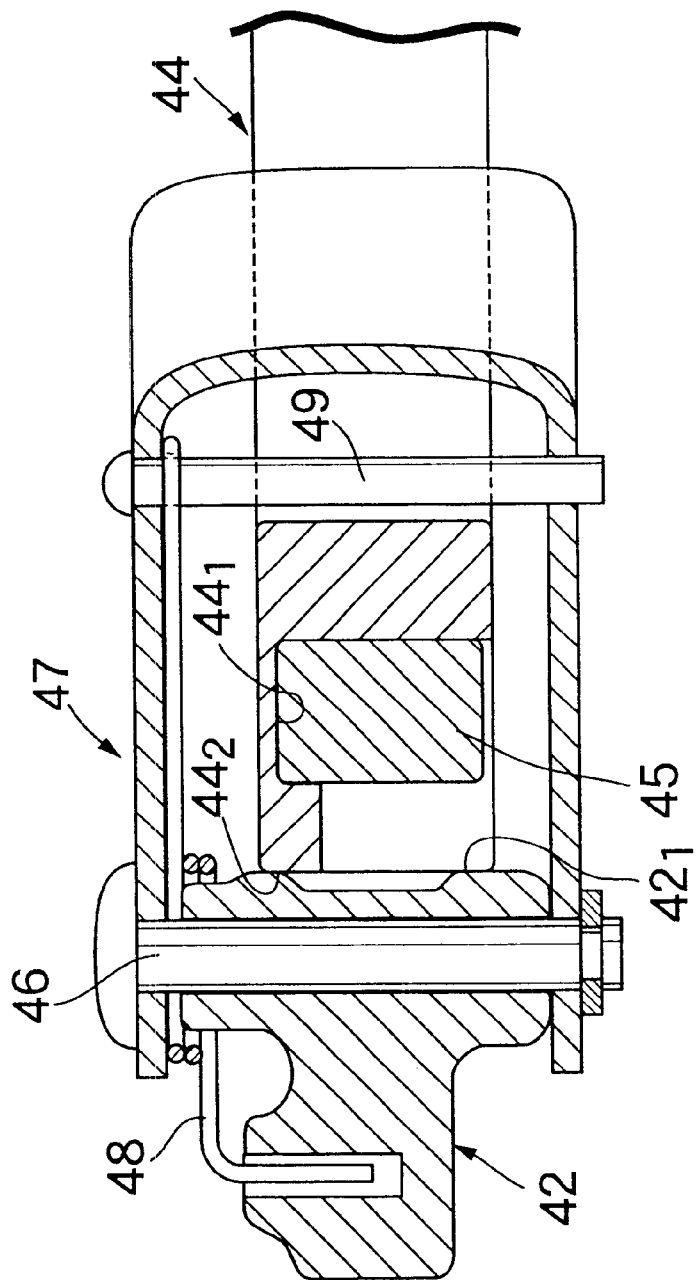
Figure 6:
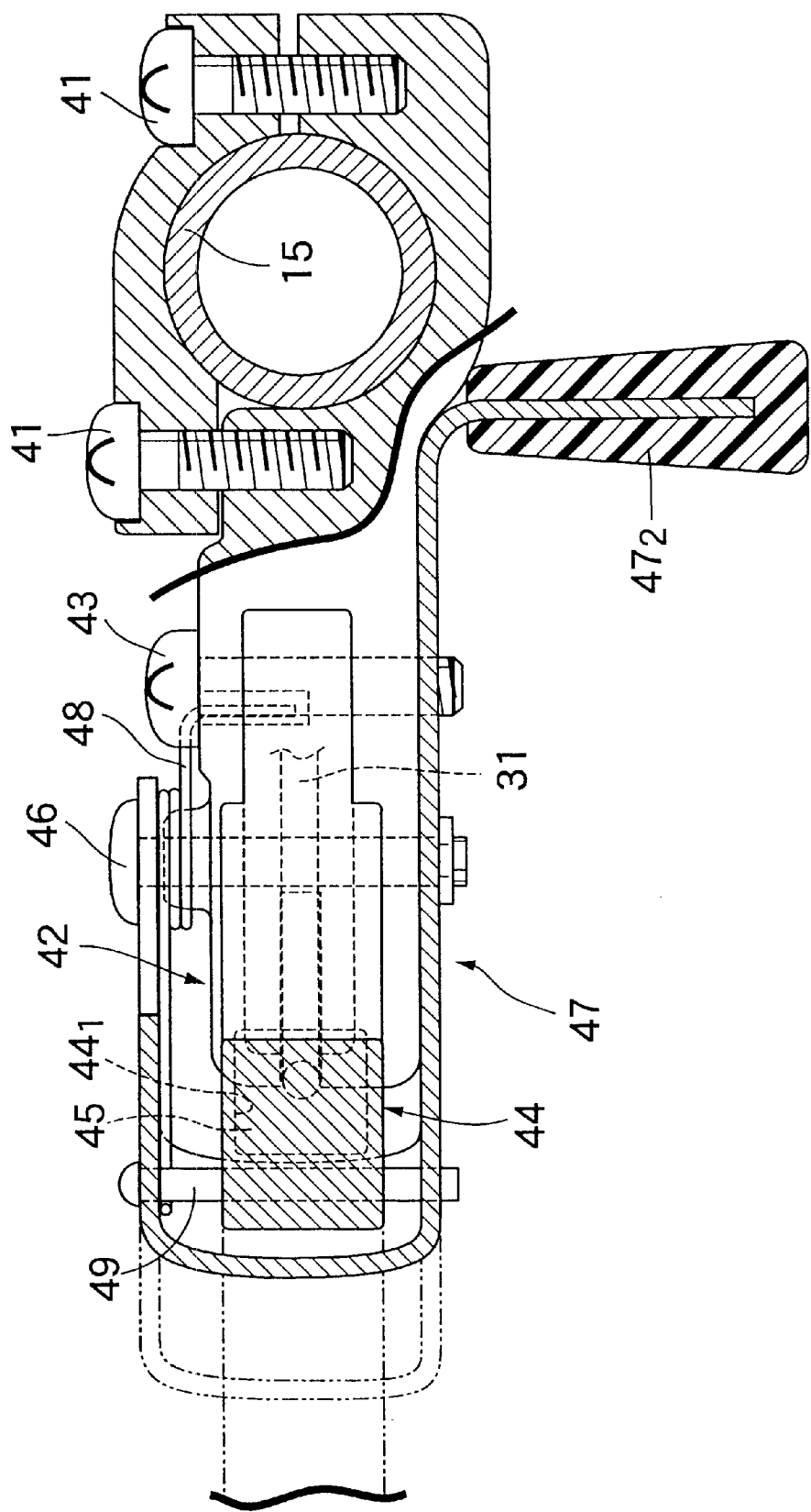
Figure 7:
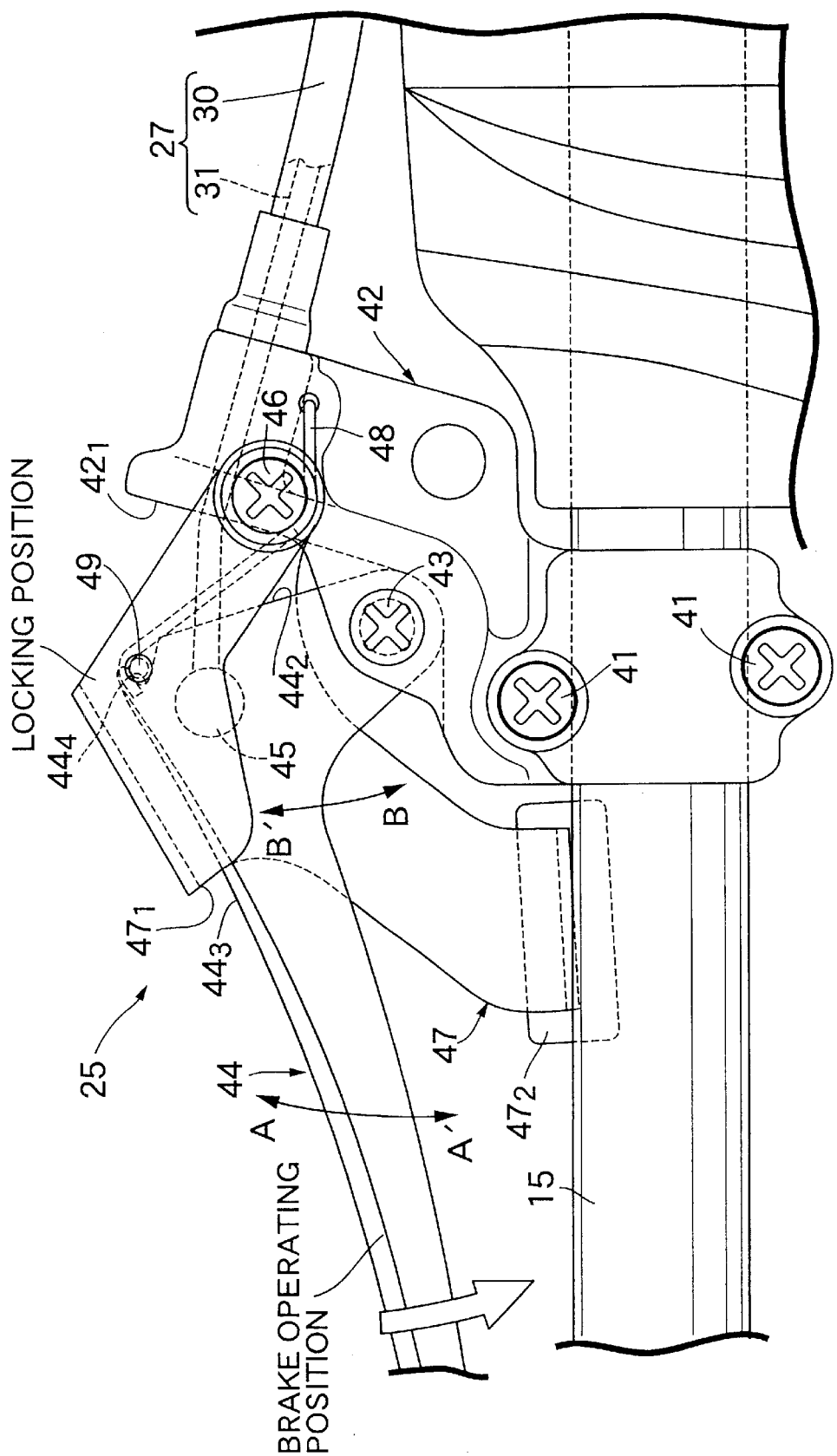

When the perking brake lever 44 is in the brake releasing position shown in FIG. 4, the lever locking member 47 is in the unlocking position, and the stop face $47_1$ of the lever locking member 47 biased in the direction of the arrow B by the torsion spring 48, is stopped in abutment against the stop face $44_3$ of the parking brake lever 44. When the driver grasps the parking brake lever 44 with his left hand as shown in FIG. 7 to operate the parking brake lever 44 in the direction of an arrow A', from the brake releasing position to the brake operating position against the resilient force of the return spring 34, (see FIG. 3) in order to operate the parking brake device 26 from this state, the lever locking member 47 is swung, while following the parking brake lever 44, under the action of a resilient force of the torsion spring 48, and ultimately, the locking pin 49 of the lever locking member 47 is engaged into the locking groove $44_4$ in the parking brake lever 44.

When the locking pin 49 has been engaged into the locking groove $44_4$ in this manner, the mounting bracket 42, the parking brake lever 44 and the lever locking member 47 form a triangle having apexes provided by the first support shaft 43, the second support shaft 46 and the locking pin 49. Therefore, the parking brake lever 44 is locked at the brake operating position, and the lever locking member 47 is locked at the locking position. At this time, the locking pin 49 of the lever locking member 47 is biased in the direction of the arrow B in FIG. 7, and the locking groove $44_4$ in the parking brake lever 44 is biased in the direction of the arrow A by the return spring 34. Therefore, there is not a possibility that the engagement of the locking pin 49 and the locking groove $44_4$ cannot be released.

When the parking brake lever 44 has been locked at the brake operating position in the above manner, the inner cable wire 31 of the Bowden cable 27 is pulled, whereby the brake arm 29 is swung and hence, the parking brake device 26 is operated to brake the rear wheels Wr, Wr, so that they cannot be rotated.

Figure 8:
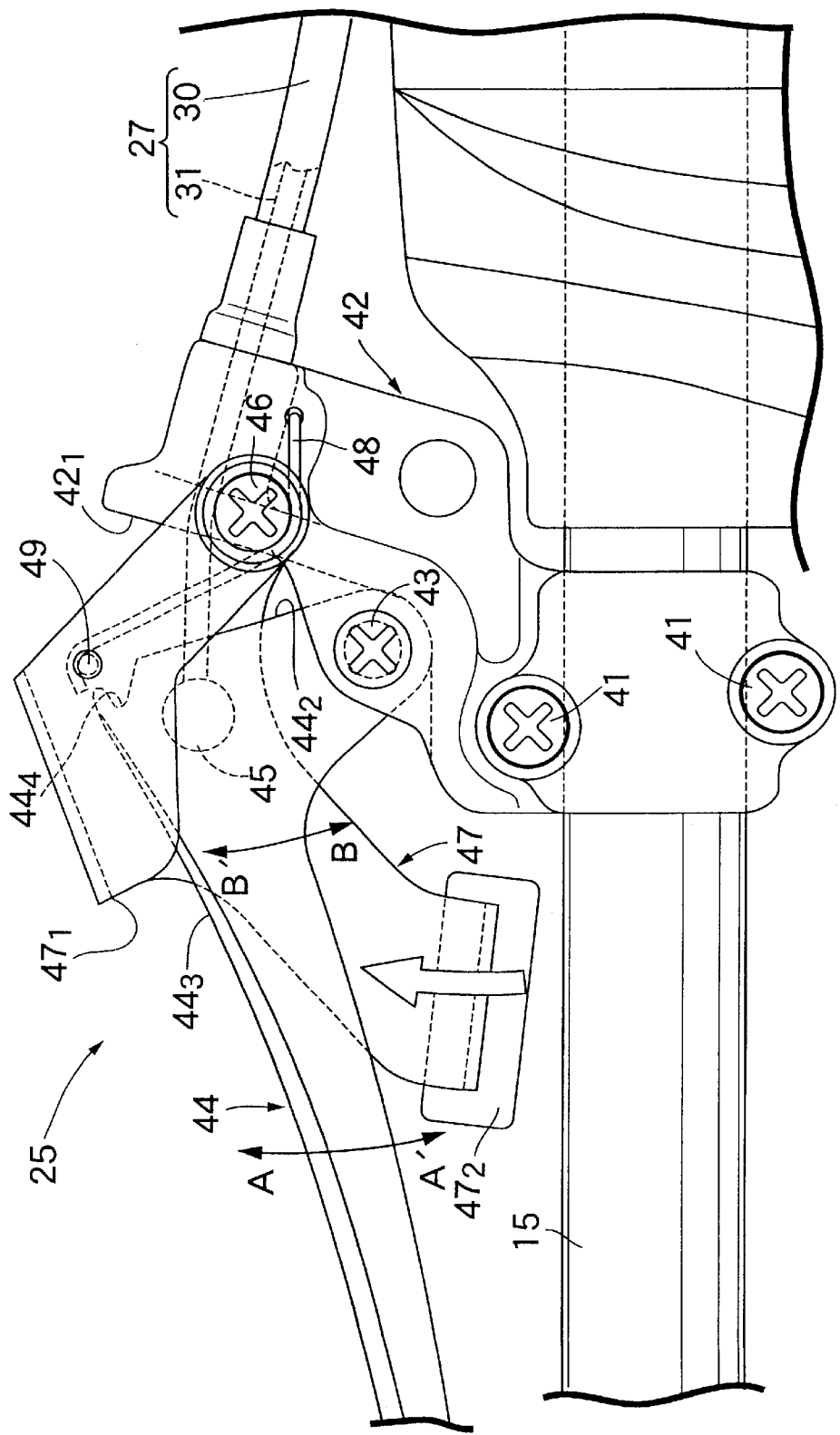

When the driver urges the operating portion $47_2$ of the lever locking member 47 against the resilient force of the torsion spring 48 with a thumb of his or her left hand, as shown in FIG. 8, in order to release the operation of the parking brake device 26, the locking pin 49 of the lever locking member 47 is disengaged from the locking groove $44_4$ in the parking brake lever 44. As a result, the parking brake lever 44 pulled by the inner cable wire 31 of the Bowden cable 27 to which the resilient force of the return spring 34 mounted on the parking brake device 26 is applied, is swung in the direction of the arrow A and returned to the initial brake releasing position, and the lever locking member 47 is also swung in the direction of the arrow B' by the resilient force of the torsion spring 48 and returned to the initial unlocking position (see FIG. 4).

In this way, when the braking is effected, the parking brake lever 44 can be locked at the brake operating position by the lever locking member 47 by grasping only the parking brake lever 44. When the braking is released, the locking of the parking brake lever 44 by the lever locking member 47 can be released by urging only the lever locking member 47. Therefore, the operation of the parking brake operating device is simplified, leading to a remarkably enhanced operability.

The locking groove $44_4$ has been provided in the parking brake lever 44 and the locking pin 49 has been provided on the lever locking member 47 in the above embodiment, but the positional relationship between the locking groove $44_4$ and the locking pin 49 can be reversed, and a projection and a recess other than the locking groove $44_4$ and the locking pin 49 can be employed as engage portions. Further, the lock device for the parking brake lever according to the embodiment of the present invention is applicable to any vehicle, not only to an electric wheelchair.

As discussed above, when the driver operates the parking brake lever from the brake releasing position to the brake operating position to conduct the braking, the lever locking member is swung from the unlocking position to the locking position by the resilient force of the second resilient biasing means, whereby the first engage portion of the parking brake lever is brought into engagement with the second engage portion of the lever locking member at the locking position, to lock the parking brake lever at the brake operating position. Therefore, the lever locking member can be operated only by operating the parking brake lever to complete the locking operation of the parking brake lever. When the driver operates the lever locking member from the locking position to the unlocking position against the resilient force of the second resilient biasing means, to release the braking, the second engage portion of the lever locking member is disengaged from the first engage portion of the parking brake lever, thereby permitting the parking brake lever to be swung from the brake operating position to the brake releasing position by the resilient force of the first resilient biasing means. Therefore, the parking brake lever can be operated only by operating the lever locking member to complete the releasing operation of the locking of the parking brake lever. In this way, both the operation of locking the parking brake lever and the operation of releasing the locking of the parking brake lever can be carried out in a single stage, leading to a remarkably enhanced operability.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A parking brake assembly for a small-sized vehicle, comprising;

a first support shaft;

a support member, a parking brake lever swingably supported on the support member by the first support shaft, the parking brake lever being operated from a brake releasing position to a brake operating position by a driver for braking, a first resilient biasing means for biasing the parking brake lever toward the brake releasing position, a second support shaft, a lever locking member swingably supported on the support member by the second support shaft, the locking member being swung to a locking position of locking the parking brake lever at the brake operating position for braking, and operated from the locking position toward an unlocking position by the driver for releasing the braking, a second resilient biasing means for biasing the lever locking member toward the locking position, a first engage portion on the parking brake lever, and a second engage portion on the lever lock member for being brought into engagement with the first engage portion of the parking brake lever, wherein when the parking brake lever is moved from the brake releasing position to the brake operating position for braking, the lever locking member is swung from the unlocking position to the locking position by the resilient force of the second resilient biasing means while following the parking brake lever moving to the brake operating position, whereby the first engage portion of the parking brake lever is brought into engagement with the second engage portion of the lever locking member swung to the locking position to lock the parking brake lever at the brake operating position, and wherein when the lever locking member is moved against the resilient force of the second resilient biasing means from the locking position to the unlocking position for releasing the braking, the second engage portion of the lever locking member is disengaged from the first engage portion of the parking brake lever, and the parking brake lever is swung from the brake operating position to the brake releasing position by the resilient force of the first resilient biasing means while being accompanied by the lever locking member.

2. A lock device for a parking brake lever as set forth in claim 1, wherein the first resilient biasing means is a spring.

3. A lock device for a parking brake lever as set forth in claim 1, wherein the support member is a mounting bracket.

4. A lock device for a parking brake lever as set forth in claim 1, wherein the first engage portion is a locking groove.

5. A lock device for a parking brake lever as set forth in claim 4, wherein the second engage portion is a locking pin.

6. A lock device for a parking brake lever as set forth in claim 1, wherein the second resilient biasing means is a torsion spring.

* * * * *